United States Patent
Janscha et al.

(10) Patent No.: US 10,181,770 B2
(45) Date of Patent: *Jan. 15, 2019

(54) STANDBY GENERATOR WITH AIR INTAKE ON REAR WALL AND EXHAUST OPENING ON FRONT WALL

(71) Applicant: Briggs & Stratton Corporation, Wauwatosa, WI (US)

(72) Inventors: Ryan D. Janscha, Brookfield, WI (US); Robert G. Townsend, Delafield, WI (US); Troy D. Tesmer, Oconomowoc, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,723

(22) Filed: Jul. 19, 2018

(65) Prior Publication Data

US 2018/0323680 A1 Nov. 8, 2018

Related U.S. Application Data

(60) Continuation of application No. 15/682,335, filed on Aug. 21, 2017, now Pat. No. 10,044,243, which is a
(Continued)

(51) Int. Cl.
*H02K 5/04* (2006.01)
*H02K 7/18* (2006.01)
(Continued)

(52) U.S. Cl.
CPC .......... *H02K 7/1815* (2013.01); *A47B 81/00* (2013.01); *A47B 96/00* (2013.01); *F01N 1/02* (2013.01);
(Continued)

(58) Field of Classification Search
None
See application file for complete search history.

(56) References Cited

U.S. PATENT DOCUMENTS

| | | |
|---|---|---|
| 2,543,541 A | 2/1951 | Angle |
| D194,490 S | 1/1963 | Wilslow et al. |
| | (Continued) | |

FOREIGN PATENT DOCUMENTS

| | | |
|---|---|---|
| CN | 202039946 | 11/2011 |
| DE | 33 34 429 | 4/1985 |
| | (Continued) | |

OTHER PUBLICATIONS

Cummins-Onan RS 12000 12 KW generator specification, available by Oct. 28, 2009, 5 pages.
(Continued)

*Primary Examiner* — Tho D Ta
(74) *Attorney, Agent, or Firm* — Foley & Lardner LLP

(57) ABSTRACT

A standby generator includes an engine including an output shaft, an alternator, and an enclosure including a base and a number of walls extending from the base including a front wall, a rear wall, a first wall, and a second wall. The standby generator includes an intake opening configured to allow air to be drawn into the enclosure and an exhaust opening configured to allow heated air and exhaust gases to be expelled from the enclosure. The intake opening is provided on the rear wall proximate the first wall and the exhaust opening is provided on the front wall proximate the second wall. The air drawn into the enclosure at the first intake opening directly flows over the engine and is expelled through the exhaust opening.

20 Claims, 4 Drawing Sheets

Related U.S. Application Data continuation of application No. 15/244,677, filed on Aug. 23, 2016, now Pat. No. 9,755,480, which is a continuation of application No. 14/496,867, filed on Sep. 25, 2014, now Pat. No. 9,431,865, which is a division of application No. 13/358,417, filed on Jan. 25, 2012, now Pat. No. 8,872,361.

(51) Int. Cl.

| | | |
|---|---|---|
| *F02M 35/10* | (2006.01) | |
| *F04B 39/00* | (2006.01) | |
| *A47B 81/00* | (2006.01) | |
| *A47B 96/00* | (2006.01) | |
| *F01N 1/02* | (2006.01) | |
| *F01N 13/08* | (2010.01) | |
| *H02K 5/10* | (2006.01) | |
| *H02K 5/24* | (2006.01) | |
| *F02B 63/04* | (2006.01) | |

(52) U.S. Cl.
CPC ............ *F01N 13/08* (2013.01); *F02B 63/04* (2013.01); *F02B 63/044* (2013.01); *F02M 35/1015* (2013.01); *F04B 39/0033* (2013.01); *H02K 5/04* (2013.01); *H02K 5/10* (2013.01); *H02K 5/24* (2013.01); *H02K 7/18* (2013.01); *F02B 2063/045* (2013.01)

(56) References Cited

U.S. PATENT DOCUMENTS

| | | |
|---|---|---|
| 3,096,900 A | 7/1963 | Breneman |
| 3,586,915 A | 6/1971 | Urquhart et al. |
| 3,666,978 A | 5/1972 | Renner |
| 3,714,449 A | 1/1973 | De Bella |
| 3,756,137 A | 9/1973 | Scharres |
| 3,791,682 A | 2/1974 | Mitchell |
| 3,951,114 A | 4/1976 | Fachbach et al. |
| 3,965,948 A | 6/1976 | Lundin |
| 3,990,464 A | 11/1976 | Jenkins |
| 4,007,388 A | 2/1977 | Lawyer et al. |
| 4,071,009 A | 1/1978 | Kraina |
| 4,089,464 A | 5/1978 | Teti et al. |
| 4,122,353 A | 10/1978 | Noguchi |
| 4,192,431 A | 3/1980 | Brown |
| 4,194,521 A | 3/1980 | Banta |
| 4,262,209 A | 4/1981 | Berner |
| 4,324,208 A | 4/1982 | Danckert et al. |
| 4,325,451 A | 4/1982 | Umeda |
| 4,406,387 A | 9/1983 | Rasor |
| 4,409,502 A | 10/1983 | McCabria |
| 4,493,390 A | 1/1985 | Pagano et al. |
| 4,499,733 A | 2/1985 | Farr et al. |
| 4,579,047 A | 4/1986 | Zielinski |
| 4,581,987 A | 4/1986 | Ulicny |
| 4,629,031 A | 12/1986 | Kato et al. |
| 4,676,025 A | 6/1987 | Mattscheck et al. |
| 4,698,975 A | 10/1987 | Tsukamoto et al. |
| 4,702,201 A | 10/1987 | Odo et al. |
| 4,733,750 A | 3/1988 | Poirier et al. |
| 4,835,405 A | 5/1989 | Clancey et al. |
| 4,836,369 A | 6/1989 | Pickering |
| 4,871,922 A | 10/1989 | Heinrich et al. |
| 4,928,583 A | 5/1990 | Taylor et al. |
| 4,958,687 A | 9/1990 | Nakagawa |
| 5,003,948 A | 4/1991 | Churchill et al. |
| 5,014,660 A | 5/1991 | Westerbeke, Jr. |
| 5,074,254 A | 12/1991 | Takamatsu |
| 5,125,236 A | 6/1992 | Clancey et al. |
| 5,125,378 A | 6/1992 | Westerbeke, Jr. |
| 5,177,390 A | 1/1993 | Van Maaren |
| 5,181,541 A | 1/1993 | Bodenheimer |
| 5,183,175 A | 2/1993 | Brown |
| 5,274,200 A | 12/1993 | Das et al. |
| 5,305,673 A | 4/1994 | Costley |
| 5,351,476 A | 10/1994 | Laborie et al. |
| 5,355,927 A | 10/1994 | McKeon |
| 5,406,050 A | 4/1995 | Macomber et al. |
| 5,425,673 A | 6/1995 | Mahlanen et al. |
| 5,433,175 A | 7/1995 | Hughes et al. |
| 5,467,747 A | 11/1995 | Brandt et al. |
| 5,515,816 A | 5/1996 | Ball et al. |
| 5,575,349 A | 11/1996 | Ikeda et al. |
| 5,625,172 A | 4/1997 | Blichmann et al. |
| 5,626,105 A | 5/1997 | Locke et al. |
| 5,642,702 A | 7/1997 | Kouchi et al. |
| 5,693,108 A | 12/1997 | Roome |
| 5,694,889 A | 12/1997 | Ball et al. |
| 5,731,687 A | 3/1998 | Hirano et al. |
| 5,734,148 A | 3/1998 | Latvis et al. |
| 5,810,405 A | 9/1998 | Kettlewood |
| 5,816,102 A | 10/1998 | Kern et al. |
| 5,850,061 A | 12/1998 | Klompenhouwer et al. |
| 5,890,460 A | 4/1999 | Ball et al. |
| 5,899,174 A | 5/1999 | Anderson et al. |
| 5,914,467 A | 6/1999 | Jonas et al. |
| 5,929,394 A | 7/1999 | Westerbeke, Jr. |
| 5,959,841 A | 9/1999 | Allen et al. |
| D416,537 S | 11/1999 | Imai et al. |
| 5,977,667 A | 11/1999 | Hirose |
| 6,016,634 A | 1/2000 | Sayer |
| 6,022,271 A | 2/2000 | Biondo |
| 6,084,313 A | 7/2000 | Frank |
| 6,095,099 A | 8/2000 | Morohoshi et al. |
| 6,116,374 A | 9/2000 | Westerbeke, Jr. |
| 6,155,921 A | 12/2000 | Evans et al. |
| 6,181,019 B1 | 1/2001 | Frank |
| 6,181,028 B1 | 1/2001 | Kern et al. |
| 6,189,649 B1 | 2/2001 | Nitschke |
| 6,310,404 B1 | 10/2001 | Frank |
| 6,313,543 B1 | 11/2001 | Frank |
| 6,331,740 B1 | 12/2001 | Morohoshi et al. |
| 6,342,004 B1 | 1/2002 | Lattimore et al. |
| 6,351,692 B1 | 2/2002 | Eaton et al. |
| 6,362,533 B1 | 3/2002 | Morohoshi et al. |
| 6,376,944 B1 | 4/2002 | Grizzle et al. |
| 6,388,869 B1 | 5/2002 | Fauteux et al. |
| H2045 H | 9/2002 | Busse et al. |
| 6,443,130 B1 | 9/2002 | Turner et al. |
| 6,447,264 B1 | 9/2002 | Lucas et al. |
| 6,489,690 B1 | 12/2002 | Hatsugai et al. |
| 6,597,571 B2 | 7/2003 | Kubota et al. |
| 6,630,756 B2 | 10/2003 | Kern et al. |
| 6,644,923 B1 | 11/2003 | Fine et al. |
| 6,657,123 B2 | 12/2003 | Moore |
| 6,657,416 B2 | 12/2003 | Kern et al. |
| 6,657,861 B2 | 12/2003 | Irmer |
| 6,660,967 B2 | 12/2003 | Brofft et al. |
| 6,685,447 B2 | 2/2004 | Mabe et al. |
| 6,686,547 B2 | 2/2004 | Kern et al. |
| 6,700,356 B1 | 3/2004 | Dorn |
| 6,701,221 B1 | 3/2004 | Eaton et al. |
| 6,731,098 B1 | 5/2004 | Hintz et al. |
| 6,756,693 B2 | 6/2004 | Kennedy |
| 6,784,574 B2 | 8/2004 | Turner et al. |
| 6,813,143 B2 | 11/2004 | Makela |
| 6,952,056 B2 | 10/2005 | Brandenburg et al. |
| 6,962,057 B2 | 11/2005 | Kurokawa et al. |
| 6,980,911 B2 | 12/2005 | Eaton et al. |
| 6,998,725 B2 | 2/2006 | Brandenburg et al. |
| D516,507 S | 3/2006 | Nushart et al. |
| 7,033,268 B2 | 4/2006 | Caliendo et al. |
| 7,157,811 B2 | 1/2007 | Eaton et al. |
| 7,193,333 B1 | 3/2007 | Kitch |
| 7,230,345 B2 | 6/2007 | Winnie et al. |
| 7,238,916 B2 | 7/2007 | Samodell et al. |
| 7,245,033 B2 | 7/2007 | Wurtele |
| 7,259,481 B2 | 8/2007 | Eaton et al. |
| 7,314,397 B2 | 1/2008 | Sodemann et al. |
| 7,325,519 B2 | 2/2008 | Sugimoto et al. |
| D564,450 S | 3/2008 | Gravlin et al. |
| 7,402,766 B1 | 7/2008 | Jonas et al. |
| 7,411,153 B2 | 8/2008 | Radtke |

(56) References Cited

U.S. PATENT DOCUMENTS

| | | |
|---|---|---|
| 7,444,982 B2 | 11/2008 | Rivet |
| 7,445,238 B2 | 11/2008 | Marriott |
| 7,461,617 B2 | 12/2008 | Onodera et al. |
| 7,482,705 B2 | 1/2009 | Piercey, III |
| 7,513,223 B2 | 4/2009 | Onodera et al. |
| 7,582,978 B2 | 9/2009 | Flanigan et al. |
| 7,597,340 B2 | 10/2009 | Hirose et al. |
| 7,642,665 B2 | 1/2010 | Konop et al. |
| 7,674,147 B2 | 3/2010 | Zwieg et al. |
| 7,739,997 B2 | 6/2010 | Leisner |
| 7,825,641 B2 | 11/2010 | Eaton et al. |
| 7,902,705 B2 | 3/2011 | Gravlin et al. |
| 8,342,330 B2 | 1/2013 | Weston et al. |
| 9,431,865 B2 * | 8/2016 | Janscha .............. F02B 63/04 |
| 9,755,480 B2 | 9/2017 | Janscha et al. |
| 10,044,243 B2 * | 8/2018 | Janscha .............. F02B 63/04 |
| 2003/0211262 A1 | 11/2003 | Ruid et al. |
| 2005/0046191 A1 | 3/2005 | Cole et al. |
| 2006/0054113 A1 | 3/2006 | Yasuda et al. |
| 2006/0065216 A1 | 3/2006 | Sugimoto et al. |
| 2006/0080971 A1 | 4/2006 | Smith et al. |
| 2007/0060037 A1 | 3/2007 | Kim et al. |
| 2007/0108767 A1 | 5/2007 | Hirose et al. |
| 2007/0137591 A1 | 6/2007 | Sugimoto et al. |
| 2007/0227470 A1 | 10/2007 | Cole et al. |
| 2008/0042625 A1 | 2/2008 | Konop et al. |
| 2008/0053746 A1 | 3/2008 | Albert et al. |
| 2008/0185801 A1 | 8/2008 | Gravlin et al. |
| 2008/0202447 A1 | 8/2008 | Kochi et al. |
| 2008/0238221 A1 | 10/2008 | Yamamoto et al. |
| 2008/0248739 A1 | 10/2008 | Carlson et al. |
| 2009/0045635 A1 | 2/2009 | Flynn |
| 2009/0050591 A1 | 2/2009 | Hart et al. |
| 2009/0058098 A1 | 3/2009 | Flynn |
| 2009/0066091 A1 | 3/2009 | Hunter |
| 2010/0037837 A1 | 2/2010 | Yamasaki et al. |
| 2010/0083616 A1 | 4/2010 | Place et al. |
| 2010/0147838 A1 | 6/2010 | Whittam et al. |
| 2010/0161270 A1 | 6/2010 | Jayasheela |
| 2011/0115235 A1 | 5/2011 | Steffl |
| 2011/0148228 A1 | 6/2011 | Gravlin et al. |
| 2016/0233739 A1 | 8/2016 | Jenison et al. |

FOREIGN PATENT DOCUMENTS

| | | |
|---|---|---|
| EP | 0 801 837 B1 | 2/2002 |
| EP | 1 302 638 | 4/2003 |
| EP | 1 645 737 | 4/2006 |
| EP | 1 887 197 | 2/2008 |
| EP | 2 192 664 A1 | 6/2010 |
| GB | 2 200 742 A | 8/1988 |
| KR | 893713 B1 | 4/2009 |
| WO | WO-02/070874 A3 | 9/2002 |
| WO | WO-2006/035636 A1 | 4/2006 |
| WO | WO-2008/027370 A2 | 3/2008 |
| WO | WO-2010/060481 A1 | 6/2010 |
| WO | WO-2010/060482 A1 | 6/2010 |
| WO | WO-2011/088450 A2 | 7/2011 |
| WO | WO-2011/088460 A2 | 7/2011 |

OTHER PUBLICATIONS

Generac Home Standby Generator Sets, 7, 10 and 13KW specifications, available by Oct. 28, 2009, 4 pages.

International Search Report and Written Opinion for PCT Application No. PCT/US2013/022753, dated Jun. 27, 2013, 13 pages.

Kohler Residential Generators 17RES specifications, available by Oct. 23, 2009, 2 pages.

Webpage showing Cummins-Onan RS 12000 12 KW Generator Specifications, available by Oct. 23, 2009, 3 pages.

* cited by examiner

STANDBY GENERATOR WITH AIR INTAKE ON REAR WALL AND EXHAUST OPENING ON FRONT WALL

CROSS-REFERENCE TO RELATED PATENT APPLICATIONS

This application is a continuation of U.S. application Ser. No. 15/682,335, filed on Aug. 21, 2017, which is a continuation of U.S. application Ser. No. 15/244,677, filed on Aug. 23, 2016, which is a continuation of U.S. application Ser. No. 14/496,867 filed on Sep. 25, 2014, which is a divisional of U.S. application Ser. No. 13/358,417, filed Jan. 25, 2012, all of which are incorporated herein by reference in their entireties.

BACKGROUND

The present application relates generally to the field of standby generators with removal panel. Standby generators have become popular as sources of limited amounts of power for short-term use. For example, standby generators are often connected to homes or businesses to provide power in situations where the normal power source (e.g., utility power grid) fails. Standby generators generally include a prime mover that provides mechanical power to a generator or alternator that includes a rotor that rotates to generate useable electricity. The electricity is delivered via a switch, breaker, or other interruptible device to the home, business, or facility for use. Such generators may be provided in an enclosure to protect internal components from tampering and the elements and to manage generator noise and exhaust.

SUMMARY

One embodiment of the invention relates to a standby generator including an engine including an output shaft, an alternator and an enclosure. The enclosure includes a base and a number of side walls extending from the base including a front wall, a rear wall, a first wall, and a second wall. The intake opening is provided on the rear wall proximate the first wall and the exhaust opening is provided on the front wall proximate the second wall. The air drawn into the enclosure at the first intake opening directly flows over the engine and is expelled through the exhaust opening.

Another embodiment of the invention relates to a standby generator including an engine including an output shaft, an alternator, a base, a first pair of opposing walls and a second pair of opposing walls each coupled to the base. The first pair of opposing walls includes a front wall and a rear wall. The second pair of opposing walls includes a first wall and a second wall. The output shaft extends toward the alternator and the first wall. A first intake opening is positioned in the rear wall proximate the first wall and is configured to draw air into the generator and an exhaust opening is positioned in the front wall proximate the second wall and is configured to expel exhaust gases and heated air from the generator. The air drawn into the enclosure at the first intake opening directly flows over the engine and is expelled through the exhaust opening.

Another embodiment of the invention relates to a standby generator including an engine including an output shaft, an alternator and an enclosure. The enclosure includes a base and a number of side walls extending from the base including a front wall, a rear wall, a first wall, and a second wall. The output shaft extends toward the alternator and the first wall. A first intake opening configured to allow air to be drawn into the enclosure is provided on the rear wall and an exhaust opening configured to allow heated air and exhaust gases to be expelled from the enclosure is provided on the front wall. The air drawn into the enclosure at the first intake opening directly flows over the engine and is expelled through the exhaust opening.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
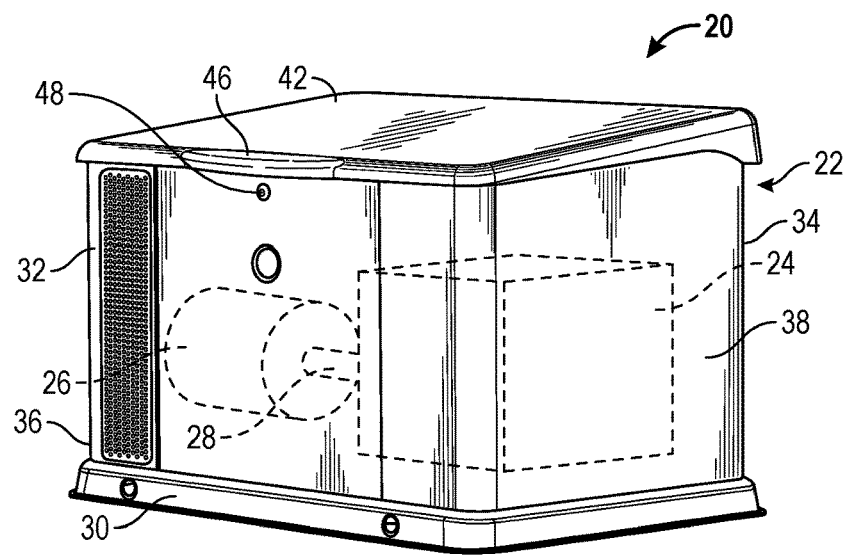
FIG. 1 is a perspective view of an enclosure for a generator, in accordance with an exemplary embodiment.

Referring to FIG. 1, a standby generator 20 is shown according to an exemplary embodiment. The generator 20 may be configured to provide power in the event of a utility power failure. According to various exemplary embodiments, the generator 20 may be a home standby generator, a portable generator, or any generator capable of providing power to a distribution panel of a building.

The standby generator 20 includes a prime mover such as an internal combustion engine 24 (e.g., a diesel engine, a rotary engine, petrol engine, etc.), and an alternator 26. Together, the engine 24 and the alternator 26 may be referred to as an engine-generator set. According to one exemplary embodiment, the engine 24 is a two-cylinder internal combustion engine with an output shaft 28 arranged such that the output shaft 28 extends substantially horizontally. The engine 24 includes an air-fuel mixing device (not shown), such as a carburetor, and an air cleaner positioned to filter particulate matter from an air stream before the air is directed to the air-fuel mixing device. Other embodiments may utilize other engines or other engine arrangements. For example, other embodiments may include a vertical shaft engine that may be coupled to a gearbox or may be directly coupled to the alternator 26. In other still embodiments, the engine 24 may be a single-cylinder engine or an engine with three or more cylinders. In other embodiments, the engine 24 may employ other fuel mixing devices such as fuel injection.

Figure 2:
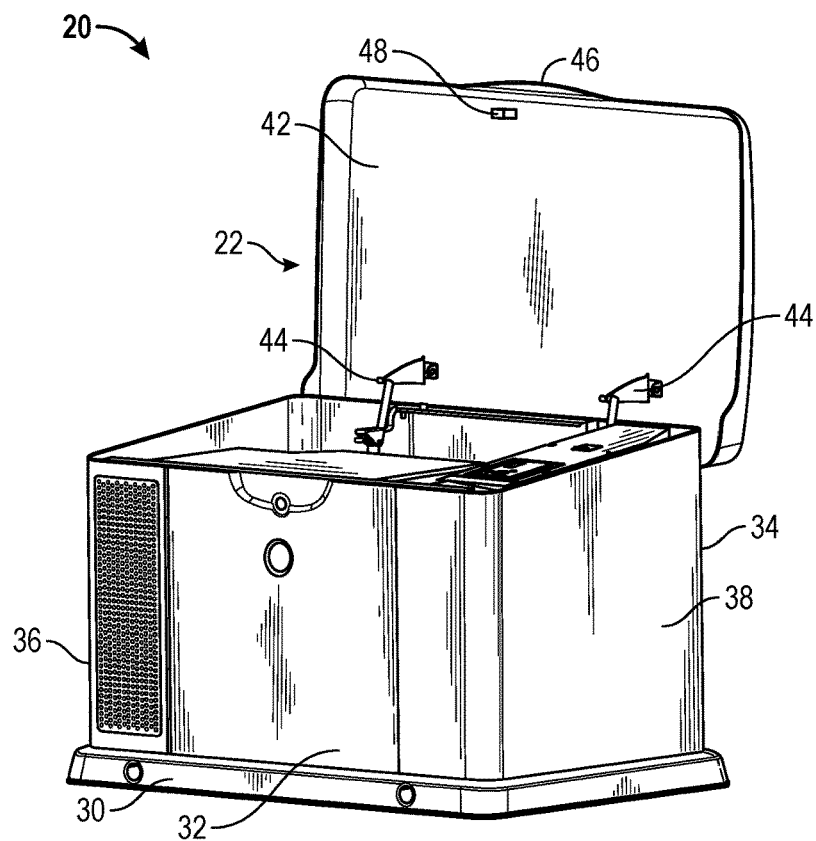
FIG. 2 is a perspective view of the enclosure of FIG. 1 with the top in an open position.

Referring to FIGS. 1 and 2, the engine 24 and the alternator 26 are contained within a housing or enclosure 22. In an exemplary embodiment, the enclosure 22 is a box-like structure with a bottom 30 (e.g., base, floor, platform, etc.) supporting the engine 24 and the alternator 26 and side walls including front 32, rear 34, left 36, and right 38 walls surrounding the engine 24 and the alternator 26. The walls 32, 34, 36, and 38 may be supported by internal frame members 40 (see FIGS. 3 and 9). A top 42 (e.g., lid, cover, roof, etc.) covers the open end of the enclosure 22. The top 42 is coupled to the rear 34 via hinges 44, allowing the top 42 to be pivoted to allow access to the interior of the enclosure 22 (e.g., to service or repair the standby generator 20). The hinges 44 are compact and occupy a minimal amount of space within the interior of the enclosure 22. A locking device 48 may be provided to retain the top 42 in a closed position, as shown in FIG. 1. According to other exemplary embodiments, the enclosure 22 may lack hinges 44 and the enclosure 22 may be opened by lifting the top 42 off of the enclosure 22.

Figure 3:
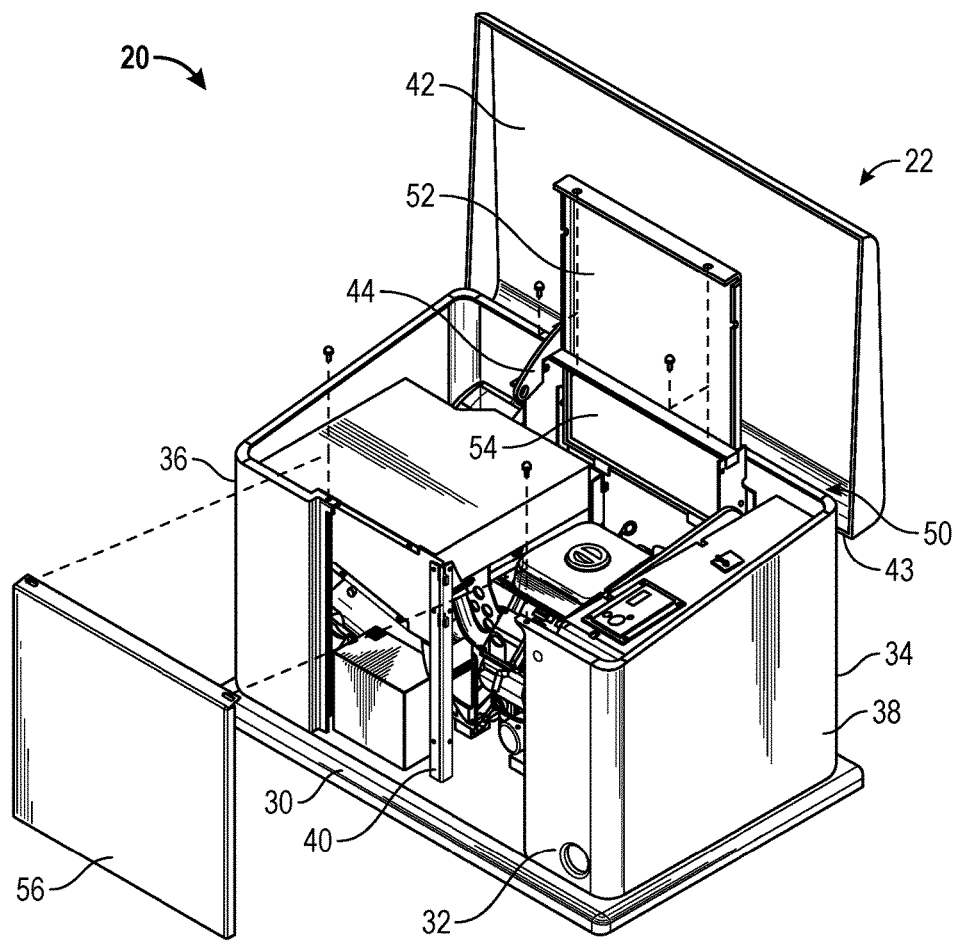
FIG. 3 is a perspective view of the enclosure of FIG. 1 with the top in an open position and with a portion of the front panel and the rear panel removed.

The top 42 may include a handle 46 to facilitate the opening of the top 42. The hinges 44 may include positive lifting devices such as gas springs that generate an upward force to assist in the opening of the top 42 and prevent the unintended closing of the top 42 from the open position. Referring to FIG. 3, the top 42 is able to be opened more than 90 degrees from the horizontal position (i.e., past vertical), further reducing the unintended closing of the top 42. The hinges 44 are coupled to the top 42 at a distance away from the back edge 43 of the top 42. In an open position, the hinges 44 space the top 42 away from the rear wall 34, creating a gap 50. The rear wall 34 in the embodiment shown in FIG. 3 includes a removable panel 52. With the top 42 in an open position, the removable panel 52 can be removed upward through the gap 50 without further disassembly of the enclosure 22 (e.g., removing the top 42) to allow access to the engine 24 and the alternator 26 through an opening 54. Other portions of the enclosure 22, including all or part of the front 32, the left side 36, or the right side 38 (e.g., a front removable panel 56) may also be removed without removing the top 42. In this way, multiple sides of the engine 24 and the alternator 26 can be accessed for service or repair with a minimum of time and effort.

Figure 4:
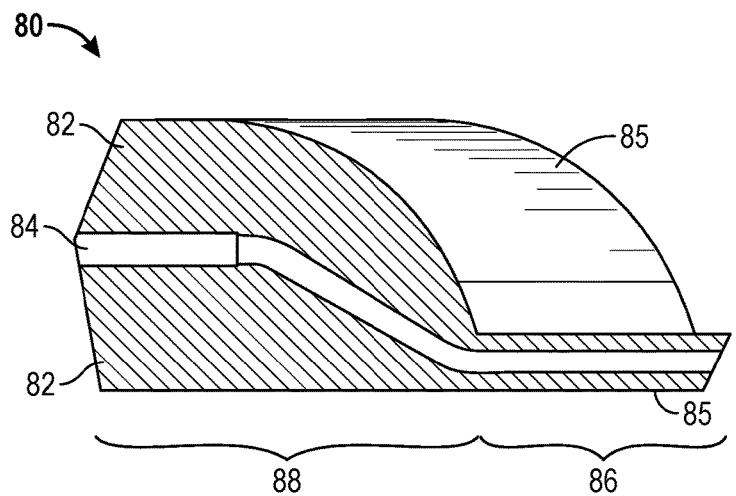
FIG. 4 is a schematic isometric cross section view of a compressed fiberglass panel, in accordance with an exemplary embodiment.

The panels of the enclosure 22 may be formed of a fiberglass material. Interior panels and components, such as ductwork may also be formed of a fiberglass material. Referring to FIG. 4, a portion of a fiberglass panel 80 is shown according to an exemplary embodiment. The panel 80 is formed of one or more fiberglass substrate layers 82. Additional reinforcing bond layers 84 may be included to increase the rigidity of the panel 80. One or both outer surfaces of the panel 80 may further include an outer facing layer 85 formed of a reflective material, such as a metallic foil. A thicker facing layer 85 may be provided for a panel located in the path of exhaust gasses from the engine 24. The fiberglass panel 80 is non-combustible and able to withstand elevated temperatures. According to an exemplary embodiment, air temperatures of approximately 175-200° F. may be encountered inside the enclosure 22 and air temperatures of approximately 550-700° F. may be encountered near exhaust gasses.

The panel 80 may have both compressed portions 86 and uncompressed portions 88 to facilitate the folding of a panel or the joining of multiple panels. The compressed portions 86 provide areas for secure fastening with rivets, standard threaded fasteners, curable sealants, adhesive tape, or any other suitable fastening methods. Compressed portions 86 may also be provided to increase structural rigidity and facilitate a seal between the panel 80 and a sealing member such as a gasket. In one embodiment, the compressed fiberglass panel 80 is manufactured by MAI Manufacturing of Richwood, Ohio. In such an embodiment, the compressed fiberglass substrate layer 82 may have fiber diameters in the range of 0.00023 to 0.00043 inches with a binder content in the range of approximately 10.5% to 17.5%.

Forming the panels of a compressed fiberglass material has several advantages over conventional sheet-metal panels. Conventional sheet metal panels may be coupled to an additional insulation panel (e.g., foam insulation with an aluminum or metallic polymer film layer), with the sheet metal providing structural rigidity and the insulation panel providing sound absorption and thermal insulation. A compressed fiberglass panel, on the other hand, is a single component and provides better thermal management by reflecting a greater amount of heat and better sound management by absorbing a greater amount of sound from generator exhaust and fans. Further, a compressed fiberglass panel is generally less expensive than a comparable sheet metal panel with an attached layer of insulation. Compressed fiberglass panels are able to be molded and joined in ways sheet metal cannot. Compressed fiberglass panels may be formed to lack the sharp edges common to sheet metal panels.

Figure 5:
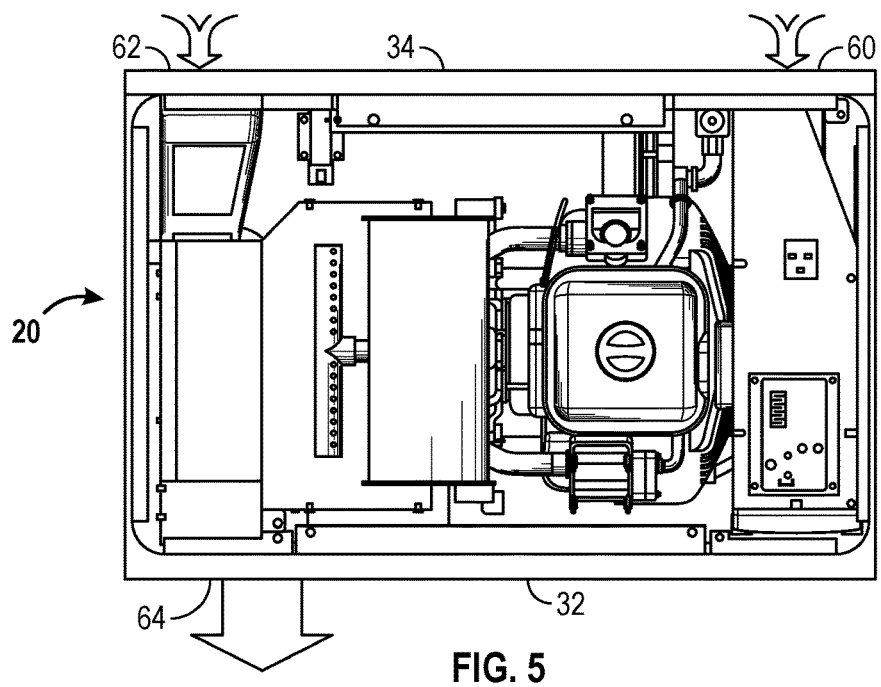
FIG. 5 is a top view of the enclosure of FIG. 1 showing an exemplary air flow path.
Figure 6:
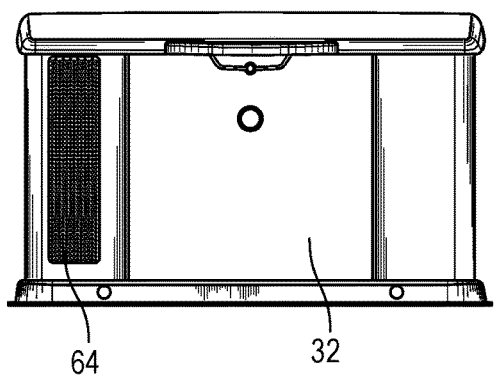
FIG. 6 is a front view of the enclosure of FIG. 1.
Figure 7:
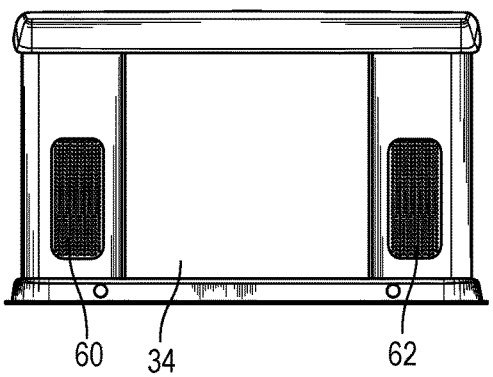
FIG. 7 is a rear view of the enclosure of FIG. 1.

Referring now to FIGS. 5-7, the engine 24 and the alternator 26 produce heat as a byproduct that can raise the internal temperature of the enclosure 22. Air is therefore circulated through the enclosure 22 to cool the engine 24 and the alternator 26. Air is also drawn in to be mixed with fuel for combustion in the engine 24 (e.g., with a carburetor or fuel injection). Air intakes are provided to allow air to be drawn into the enclosure. Outlets or exhaust openings are provided to allow heated air and exhaust to be expelled from the interior of the enclosure 22. According to an exemplary embodiment, the enclosure 22 includes separate air intakes 60 and 62 for the engine 24 and the alternator 26, respectively. The enclosure 22 further includes an exhaust opening 64 through which exhaust from the engine 24 is expelled. In other embodiments, the enclosure 22 may include more than two air intakes or a single air intake or may include multiple exhaust openings.

The exhaust opening 64 is located on the front wall 32 (see FIG. 6). The exhaust opening 64 is relatively large, diffusing the exhaust flow and slowing the exhaust velocity to reduce impact on vegetation adjacent to the enclosure 22. Because standby generators are generally placed with the rear towards an adjacent structure, locating the exhaust opening 64 on the front wall 32 directs the hot exhaust away from the adjacent structure. Confining the exhaust to the front wall 32 is intended to typically allow vegetation and combustible objects to be placed in close proximity (e.g., approximately 18" away) to the other three sides of the enclosure 22.

The air intakes 60 and 62 are located opposite of the exhaust opening 64 on the rear wall 34 (see FIG. 6).

Locating the air intakes 60 and 62 on the opposite side from the exhaust opening 64 reduces the likelihood that hot air from inside the enclosure 22 will be recirculated, and reduce the efficiency and durability of the cooling system. The engine air intake 60 and the generator air intake 62 may be provided on opposite sides of the rear wall 34.

Figure 8:
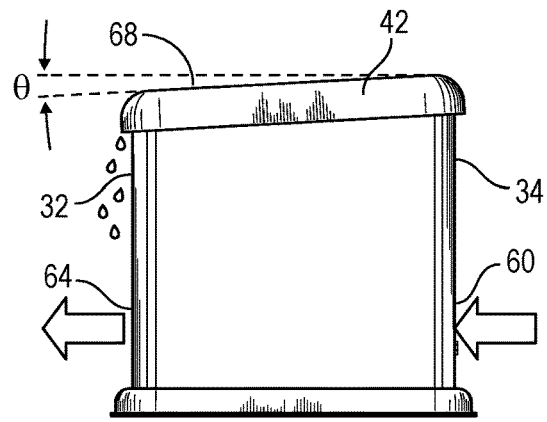
FIG. 8 is a side view of the enclosure of FIG. 1.

Referring now to FIG. 8, the top 42 is pitched to advantageously direct water and debris away from the air intakes. According to an exemplary embodiment, when the top 42 is in a closed position, the upper surface 68 is inclined at pitch angle Θ toward the front 32. In contrast to a horizontal top or domed top for an enclosure, in which water or debris striking the top of the enclosure may be shed in any direction, the top 42 with a forward-pitched upper surface 68 sheds water towards the front of the enclosure, away from the air intakes 60 and 62. Reducing the amount of air and debris that is ingested into the air intakes 60 and 62 reduces the chance of component damage and is intended to prolong the life of the engine 24 and the alternator 26. Further, with a typical installation in which the rear 34 of the enclosure 22 is oriented towards an adjacent structure (e.g., a house), the forward-pitched upper surface 68 also directs water away from the structure, reducing the likelihood of water-related damage, such as basement leaks or foundation damage. Still further, the pitched upper surface 68 discourages the placement of objects on the top 42.

Figure 9:
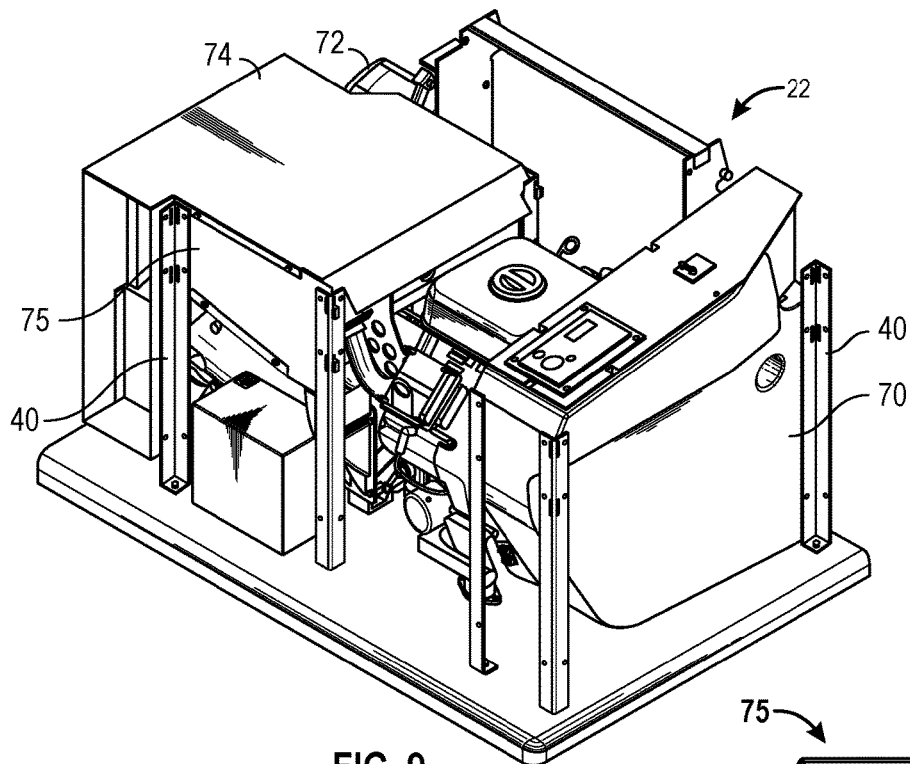
FIG. 9 is a perspective view of an enclosure of FIG. 1 with the outer panels removed to show interior components, in accordance with an exemplary embodiment.

Referring now to FIG. 9, interior ductwork and separators may be utilized inside the enclosure 22 to route cooling air toward the engine 24 and the alternator 26 and to route exhaust gasses out of the enclosure 22. According to an exemplary embodiment, an engine intake duct 70 routes outside air from the air intake 60 (FIG. 7) to the engine 24. An generator intake duct 72 routes outside air from the air intake 62 to the alternator 26. The outside air may be utilized to cool the generator components directly, or may be utilized to cool an intermediate coolant fluid with a device such as a radiator. A muffler exhaust duct 74 (e.g., muffler box) routes exhaust gasses from the engine 24 to the exhaust opening 64. The duct members 70, 72, and 74 are configured to introduce at least one 90 degree turn to the air flow between the exterior openings and any noise-producing internal components. In this way, a direct path is not present for propagating sound waves to the exterior of the enclosure 22, reducing the volume of the sound produced by the generator 20.

Figure 11:
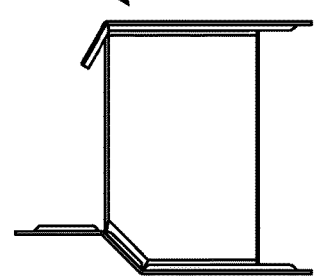
FIG. 11 is a top view of the portion of the muffler exhaust duct of FIG. 10 in a folded, assembled state.
Figure 10:
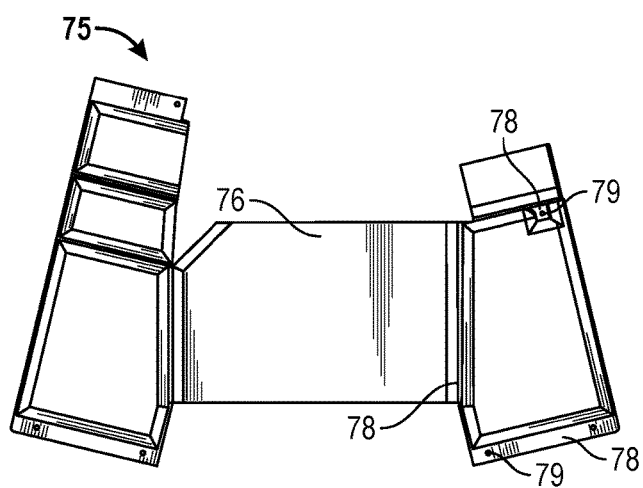
FIG. 10 is a front view of a portion of a muffler exhaust duct for a generator enclosure in a flattened state, in accordance with an exemplary embodiment.
Figure 12:
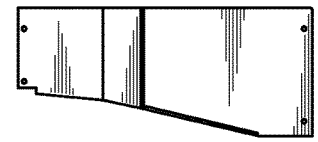
FIG. 12 is a side view of the portion of the muffler exhaust duct of FIG. 10 in a folded, assembled state.

The duct members 70, 72, and 74 may be formed of compressed fiberglass, similar to the fiberglass panel 80 described above. The duct members 70, 72, and 74 may be formed of a combination of formed panels, flat panels, and folded panels. Referring to FIGS. 10-12, folded panel 75 for a muffler exhaust duct 74 is shown according to one exemplary embodiment. The folded panel 75 includes uncompressed areas 76 and compressed areas 78. Compressed areas 78 may be utilized, for instance, along fold lines and in areas with openings 79 for coupling the panel 75 to other portions of the muffler exhaust duct 74 or to frame members 40.

The fiberglass material for the duct members 70, 72, and 74 provides thermal management by reflecting a greater amount of heat (e.g., from hot exhaust gasses) and sound management by absorbing sound from generator exhaust and fans. As described above, the fiberglass panels may also be shaped to create non-direct paths between sound-producing components and the exterior. The fiberglass duct members 70, 72, and 74 compartmentalize the interior of the enclosure 22 and reduce undesirable thermal transfer between ducts or compartments by blocking both conductive and radiant heat transfer. As illustrated in FIG. 10, members formed of fiberglass panels may be manufactured and shipped in flattened configurations, reducing warehouse and shipping space.

The construction and arrangements of the standby generator and related enclosure, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A standby generator, comprising:
   an engine including an output shaft;
   an alternator;
   an enclosure comprising:
      a base; and
      a plurality of walls extending from the base comprising a front wall, a rear wall, a first wall, and a second wall;
   a first intake opening configured to allow air to be drawn into the enclosure; and
   an exhaust opening configured to allow heated air and exhaust gases to be expelled from the enclosure;
   wherein the first intake opening is provided on the rear wall proximate the first wall and the exhaust opening is provided on the front wall proximate the second wall;
   wherein the air drawn into the enclosure at the first intake opening directly flows over the engine and is expelled through the exhaust opening.

2. The standby generator of claim 1, further comprising:
   a second intake opening provided on the rear wall configured to allow air to be drawn into the enclosure.

3. The standby generator of claim 2, wherein the first intake opening is configured to allow air to be drawn into the engine and wherein the second intake opening is configured to allow air to be drawn into the enclosure to cool the alternator.

4. The standby generator of claim 3, wherein the first intake opening and the second intake opening are positioned on opposite sides of the rear wall.

5. The standby generator of claim 3, wherein the second intake opening is positioned proximate the first wall.

6. The standby generator of claim 3, wherein the exhaust opening is positioned proximate the first wall.

7. The standby generator of claim 3, wherein the first intake opening and the second intake opening draw air into the enclosure in the same direction as an expulsion of exhaust gases from the exhaust opening.

8. A standby generator, comprising:
   an engine including an output shaft;
   an alternator
   a base;

a first pair of opposing walls coupled to the base comprising:
   a front wall; and
   a rear wall;
a second pair of opposing walls coupled to the base comprising:
   a first wall; and
   a second wall;
a first intake opening in the rear wall proximate the first wall and configured to draw air into the generator; and
an exhaust opening positioned in the front wall proximate the second wall and configured to expel exhaust gases and heated air from the generator;
wherein the air drawn into the enclosure at the first intake opening directly flows over the engine and is expelled through the exhaust opening.

9. The standby generator of claim 8, wherein the second pair of opposing walls does not include the first intake opening or the exhaust opening.

10. The standby generator of claim 9, further comprising a second intake opening positioned in the rear wall configured to draw air into the generator.

11. The standby generator of claim 10, wherein the first intake opening is configured to draw air into the generator to cool the engine and wherein the second intake opening is configured to draw air into generator to cool the alternator.

12. The standby generator of claim 11, wherein the first intake opening and the second intake opening are positioned on opposite sides of the rear wall.

13. The standby generator of claim 12, wherein the first intake opening and the second intake opening draw air into the enclosure in the same direction as an expulsion of exhaust gases from the exhaust opening.

14. The standby generator of claim 13, further comprising:
   an engine intake duct configured to route air entering the first intake opening to the engine;
   an alternator intake duct configured to route air entering the second intake opening to the alternator; and
   a muffler exhaust duct configured to route exhaust gases from the engine to the exhaust opening.

15. A standby generator, comprising:
an engine including an output shaft;
an alternator;
an enclosure comprising:
   a base; and
   a plurality of walls extending from the base comprising a front wall, a rear wall, a first wall, and a second wall;
a first intake opening provided on the rear wall and configured to allow air to be drawn into the enclosure; and
an exhaust opening provided on the front wall and configured to allow heated air and exhaust gases to be expelled from the enclosure;
wherein the first intake opening is positioned proximate the engine and the exhaust opening is positioned proximate the alternator;
wherein the air drawn into the enclosure at the first intake opening directly flows over the engine and is expelled through the exhaust opening.

16. The standby generator of claim 15, further comprising:
   a second intake opening provided on the rear wall configured to allow air to be drawn into the enclosure.

17. The standby generator of claim 16, wherein the first intake opening is configured to allow air to be drawn into the engine and wherein the second intake opening is configured to allow air to be drawn into the enclosure to cool the alternator.

18. The standby generator of claim 17, wherein the first intake opening and the second intake opening are positioned on opposite sides of the rear wall.

19. The standby generator of claim 17, wherein the first intake opening is positioned proximate the second wall and the second intake opening is positioned proximate the first wall.

20. The standby generator of claim 17, wherein the first intake opening and the second intake opening draw air into the enclosure in the same direction as an expulsion of exhaust gases from the exhaust opening.

* * * * *